3,097,996
PRESERVATIVES CONSISTING OF MIXED ANHYDRIDES OF ALKYLCARBONIC ACIDS
Wilhelm Thoma, Cologne-Flittard, and Hermann Genth, Krefeld-Bockum, Germany, assignors to Farbenfabriken Bayer Aktiengesellschaft, Leverkusen, Germany, a corporation of Germany
No Drawing. Filed Apr. 29, 1960, Ser. No. 25,546
Claims priority, application Germany May 2, 1959
6 Claims. (Cl. 167—22)

The present invention relates to and has as its objects the preservation of perishable foods, and broadly perishable goods, with mixed anhydrides of carbonic acid and carboxylic acids.

For preserving perishable goods, formic, acetic, propionic, sorbic, benzoic, p-chlorobenzoic, and p-hydroxybenzoic acids have been used. The use of esters of pyrocarbonic acids as preservatives for perishable goods has also been described (cf. United States Patent No. 2,910,400).

The foregoing object of the present invention is achieved by the use of mixed acid anhydrides as preservatives for perishable goods. The mixed anhydrides which are to be used in accordance with the present invention have the following formula

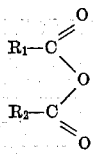

in which $R_1$ and $R_2$ are different organic radicals, one of which ($R_1$ or $R_2$) may be a substituted hydroxy radical represented as $OR_3$. $R_1$, $R_2$ and $R_3$ may be, for example, alkyl radicals such as methyl, ethyl, propyl, isopropyl, tert. butyl, 1,3-pentadienyl ($CH_3CH=CHCH=CH—$) which is the alkyl radical of sorbic acid (2,4-hexadienoic acid), or cycloalkyl radicals such as cyclohexyl, further aryl and aralkyl radicals such as phenyl, benzyl or an aralkenyl radical such as the styryl ($C_6H_5CH=CH—$) radical that is present in cinnamic acid, as well as heterocyclic radicals.

The mixed anhydrides to be used as preservatives according to the invention are produced according to known processes, for example by the reaction of carboxylic acids with a chlorocarbonic acid ester such as ethyl chlorocarbonate or ethyl chloroformate which has the formula $C_2H_5—O—CO—Cl$ in the presence of a base or, alternatively, by the reaction of a carboxylic acid salt with a carboxylic acid chloride.

The mixed acid anhydride preservatives are used in known manner. They are added as such or in the form of a solution to the food or other substances to be preserved, and intimately mixed with the food or other substances, if necessary. The quantities required may easily be determined for each case by preliminary experiments; in general, quantities of 0.01–1%, calculated on the amount of the food or other goods to be preserved, are sufficient.

The preservatives proposed according to the invention enable perishable goods of vegetable or animal origin to be preserved in an advantageous manner. The substances to be preserved according to the invention include carbohydrate-containing substances such as fruit pulp, fruit extracts or fruit juices and drug extracts; also casein and other protein-containing substances as well as injectable solutions and other pharmaceutical or cosmetic preparations of a perishable type.

The preservatives according to the invention are distinguished as compared with other preservatives in that they may first act as acylating agents and, after completion of the hydrolysis, they may bring about in the substrate with the liberated carboxylic acid a further antimicrobial action, in known manner.

The action of the carboxylic acid formed by hydrolysis distinguishes the process according to the invention especially when compared with pyrocarbonic acid esters. The acylating action of the compounds to be used according to the invention renders them superior to the mere use of a carboxylic acid. Thus, for example, the sorbic acid ethylcarbonic acid anhydride shows a higher activity against *Penicillium glaucum* and *Saccharomyces cerevisiae* than sorbic acid alone.

The amount of the mixed acid anhydride which is required to effect preservation in a particular case is generally smaller than the equivalent amount of the free acids that would be required to provide an identical degree of preservation. Thus, for example, a dosage of 0.03% of a mixed anhydride of ethylcarbonic acid and sorbic acid is sufficient for preserving orange juice. The same effect can only be attained when using sorbic acid with an amount of 0.05%. The reduced use of sorbic acid is brought about by the decomposition of the mixed anhydride into sorbic acid, carbonic acid and alcohol. The sorbic acid content ultimately amounts to 0.018% instead of 0.05% when used alone.

The following examples are given for the purpose of illustrating the invention, the parts being parts by weight.

*Example 1*

To 100 parts of a cough mixture based on dextrose and maltose, containing about 20 parts of dextrose, 5 parts of maltose in addition to cough-relieving active substances, and having a pH value of 5.5, is added 0.03 part of sorbic acid-ethylcarbonic acid anhydride in 0.3 part of absolute alcohol. After intimate distribution of the preservative, the preparation is stored at room temperature in a closed vessel. The product thus preserved is unchanged even after standing for 30 days, whereas a control mixture shows strong fermentation phenomena even after only one day.

A similar cough mixture to which was added shortly before bottling 0.03 part of pyrocarbonic acid diethyl ester, remains sterile only as long as the bottle remains closed. When the bottle is opened, fermentation phenomena as well as surface mold occur after about 48 hours.

*Example 2*

100 parts of apple pulp with a 10% sugar content and a pH of 4 are mixed with 0.06 part of acetic acid-ethylcarbonic acid anhydride and immediately sealed. The material thus treated proves to be excellently preserved.

Apple pulp mixed with 0.1 part of pyrocarbonic acid diethyl ester and then sealed shows after 10 days a growth of mold on the surface even when the container is not opened.

*Example 3*

100 parts of orange juice of a pH of 4.5 and a sugar content of 8% are treated with 0.03 part of sorbic acid-acetic acid anhydride and immediately sealed. The juice thus preserved shows no fermentation or mold infestation after prolonged storage at temperatures between 20 and 30° C. Unpreserved control samples are in a state of fermentation after 48 hours and develop mold on the surface within a further 3 days.

For the preparation of sorbic acid-acetic acid anhydride, 45 grams of anhydrous sodium acetate, suspended in 100 ml. of absolute toluene, are boiled under reflux with 65 grams of sorbic acid chloride for 4 hours. The reaction mixture is cooled and, after the addition of 300 ml. of ether, shaken out with a 5.0% sodium carbonate solution. The anhydride boils at 77–78° C./0.3 mm. Hg. Its empirical formula is $C_8H_{10}O_3$ and its molecular weight is 154. Analysis of the product gave the following results: Calculated—C, 62.30; H, 6.50; O, 31.20. Found—C, 62.35; H, 6.58; O, 31.26.

An orange juice to which had been added 0.03 part of pyrocarbonic acid diethyl ester ferments within 48 hours after opening the container and shows surface mold within 2–3 days in the same manner as the unpreserved control sample.

*Example 4*

In the table below the quantities of propionic acid-sorbic acid anhydride, benzoic acid-ethylcarbonic acid anhydride and sorbic acid are shown in percentages, which are in general sufficient to inhibit the growth of the types of fungi listed in the table:

| | Saccharomyces cerevisiae | Penicillium glaucum [1] | Aspergillus niger [1] | Everthella coli | mixed infection |
|---|---|---|---|---|---|
| Propionic acid sorbic acid anhydride. | 0.01 | 0.3 | 0.03 | 0.15 | 0.15 |
| Benzoic acid-ethylcarbonic acid anhydride. | 0.03 | 0.3 | 0.05 | 0.15 | 0.1 |
| Sorbic acid | 0.02 | 0.05–0.07 | 0.12 | | |

[1] Nutrient solution pH 4.5.

Further compounds which have been proven to be active preservatives are the following: p-chlorobenzoic acid-ethylcarbonic acid anhydride, p-chlorobenzoic acid-propylcarbonic acid anhydride, sorbic acid-propylcarbonic acid anhydride, sorbic acid-methylcarbonic acid anhydride, hexahydrobenzoic acid-ethylcarbonic acid anhydride.

We claim:

1. A process of preserving a perishable substance containing a carbohydrate that is susceptible to deterioration by the enzymatic action of microorganisms which comprises mixing with the said substance a mixed anhydride of an alkylcarbonic and a carboxylic acid of the group having the formula $$X-\underset{\underset{O}{\|}}{C}-O-\underset{\underset{O}{\|}}{C}-O-Y$$

in which X is a radical of the group consisting of methyl and 1,3-pentadienyl and Y is a lower alkyl radical in an amount sufficient to inhibit enzymatic deterioration of the said substance.

2. A method for the preservation of perishable goods which comprises incorporating therein sorbic acid-ethylcarbonic acid anhydride.

3. A method for the preservation of perishable goods which comprises incorporating therein acetic acid-ethylcarbonic acid anhydride.

4. A perishable substance containing a carbohydrate that is susceptible to deterioration by the enzymatic action of microorganisms having mixed therewith a mixed anhydride of an alkylcarbonic and a carboxylic acid of the group having the formula $$X-\underset{\underset{O}{\|}}{C}-O-\underset{\underset{O}{\|}}{C}-O-Y$$

in which X is a radical of the group consisting of methyl and 1,3-pentadienyl and Y is a lower alkyl radical in an amount sufficient to inhibit enzymatic deterioration of the said substance.

5. A perishable substance as defined in claim 4 in which the mixed anhydride is the mixed anhydride of sorbic and ethylcarbonic acids.

6. A perishable substance as defined in claim 4 in which the mixed anhydride is the mixed anhydride of acetic and ethylcarbonic acids.

References Cited in the file of this patent

UNITED STATES PATENTS

| 1,311,709 | Plaisance | July 29, 1919 |
| 2,217,905 | Hoffman et al. | Oct. 15, 1940 |
| 2,379,294 | Gooding | June 26, 1945 |

FOREIGN PATENTS

| 565,934 | Germany | Dec. 7, 1932 |

OTHER REFERENCES

Chemical Abstracts, vol. 43, page 6980A; vol. 50, page 14727f; vol. 53, page 3133C.